US005765822A

United States Patent [19]

Mead

[11] Patent Number: 5,765,822

[45] Date of Patent: Jun. 16, 1998

[54] CLAMPING APPARATUS FOR SECURELY HOLDING OBJECTS

[76] Inventor: Elwin F. Mead, 1974 Ricochet Ranch Rd., Overgaard, Ariz. 85933

[21] Appl. No.: 734,394

[22] Filed: Oct. 17, 1996

[51] Int. Cl.$^{6}$ ........................................ B23Q 3/02

[52] U.S. Cl. ........................ 269/96; 269/97; 269/100

[58] Field of Search ........................ 269/45, 95–100, 269/900, 152, 155, 249

[56] References Cited

U.S. PATENT DOCUMENTS

| | | | |
|---|---|---|---|
| 95,337 | 9/1869 | Goulden | 269/100 |
| 439,918 | 11/1890 | Wilkes | 269/96 |
| 444,778 | 1/1891 | Greenamyer . | |
| 799,026 | 9/1905 | Barrow . | |
| 1,160,103 | 11/1915 | Burkhart | 269/97 |
| 1,334,971 | 3/1920 | Shore | 269/3 |
| 1,365,344 | 1/1921 | Rosenberg . | |
| 1,410,184 | 3/1922 | Hunter . | |
| 1,981,826 | 1/1934 | Hevmann | 269/98 |
| 2,616,319 | 11/1952 | Le May . | |
| 2,636,527 | 4/1953 | Schiemann | 269/45 |
| 2,735,462 | 2/1956 | Olsen | 269/100 |
| 2,844,981 | 7/1958 | Steine | 269/98 |
| 2,980,948 | 4/1961 | McCain . | |
| 3,024,018 | 3/1962 | Manz . | |
| 3,937,451 | 2/1976 | DiPaola et al. . | |
| 4,089,513 | 5/1978 | Mack . | |
| 4,141,542 | 2/1979 | Wolff | 269/98 |
| 4,383,825 | 5/1983 | Crouse | 269/96 |
| 4,747,590 | 5/1988 | Yang | 269/45 |
| 4,828,240 | 5/1989 | Longenecker et al. | 269/100 |
| 4,928,939 | 5/1990 | Bell et al. | 269/900 |
| 5,013,017 | 5/1991 | Swann | 269/900 |
| 5,090,670 | 2/1992 | Yang . | |

*Primary Examiner*—Robert C. Watson
*Attorney, Agent, or Firm*—Schmeiser, Olsen & Watts

[57] ABSTRACT

According to the present invention, a method and clamping apparatus for securely holding objects is disclosed. The clamping apparatus works in conjunction with hand tools used for holding objects such as a pair of locking pliers, micrometers, tweezers, tongs, etc. and can be attached to a workbench, table, or other stable surface. A preferred embodiment of the clamping apparatus has two main components: a base module which can be readily attached to a workbench, table, or similar stable surface; and a clamping module which is used to securely hold the hand tool. The two modules fit together by inserting several dowel pieces located on one module into corresponding holes located in the other module. The two separate modules are held together by frictional contact between the dowel pieces and the holes that occurs due to bending moments created when the base module is attached to a stable surface. A slight deformation of the base module causes the dowel pieces located on one module to exert pressure against the internal sidewalls of the holes in the body of the other module. This frictional binding is sufficient to keep the two modules from separating. In the case of a pair of locking pliers, the clamping module is designed to hold the locking pliers in place by turning a screw which contacts the head portion of the locking pliers.

2 Claims, 4 Drawing Sheets

CLAMPING APPARATUS FOR SECURELY HOLDING OBJECTS

BACKGROUND OF THE INVENTION

1. Technical Field

This invention generally relates to the use of tools, and more specifically relates to using locking pliers and other hand tools.

2. Background Art

Hand tools are an important part of our everyday life. Hand tools such as hammers, screwdrivers, and wrenches are well known and frequently used to perform repairs and maintenance around the home or shop. Additional examples of well known hand tools include tweezers, tongs, locking pliers and similar tools that are used to grip or hold objects. Hand tools for holding, clamping, or otherwise securely gripping objects may be found in almost any shop, toolbox, or home. Locking pliers are one of the most common hand tools used for securely gripping or holding objects. A pair of locking pliers will typically have a pair of opposable handles with lever-action clamping jaws that can be locked into position and used to clamp and hold objects of various shapes and sizes. The opposable handles are generally held together at a pivot point and joined by a rivet or some other fastening mechanism. In addition, the jaw pressure of the locking pliers can usually be adjusted by manipulating a tension control mechanism, which is typically located in the handle portion of the locking pliers.

Many companies located throughout the world now manufacture and sell locking pliers in an ever-increasing number of styles and varieties. The basic locking pliers tool has been vigorously adapted to perform an almost infinite variety of jobs. One well known brand name for locking pliers is ViseGrip brand locking pliers. ViseGrip brand locking pliers are currently manufactured in more than 34 varieties. In addition, many other companies located throughout the world have manufactured and marketed their own versions of locking pliers. These companies include Craftsman, Crescent, Popular Mechanics, etc.

While locking pliers, tweezers, tongs, etc. are very popular because of their versatility in holding objects, there are some limitations to their usefulness. For example, most individuals will occasionally desire to use the hand tool to hold an object while the individual manipulates the object, or performs an operation on the object being held. Since the individual will often need both hands to manipulate the object or perform the operation, the individual will attempt to secure the locking pliers, tweezers, or tongs to some convenient surface. However, given the size and shape of these various hand tools, there is usually no easy way to accomplish this.

For example, a standard bench-mounted clamping vise might be used in an attempt to securely hold a pair of locking pliers. This method is undesirable for several reasons. First, the jaws of the clamping vise, when tightened, may mar the surface of the locking pliers. In addition, over-tightening of the clamping vise jaws may damage the hinged lever mechanism of the locking pliers jaws. Further, the clamping action may restrict the free movement of the opposable jaws, making it difficult or impossible to open and close the jaws of the locking pliers. Finally, the locking pliers may slip out of the jaws of the clamping vise if the jaws of the vise are not tightened enough. If the surface of the locking pliers is marred, corrosive chemicals or materials may attack the metal and weaken the pliers, shortening the useful life of the pliers or eventually causing failure. Obviously, if the hinged lever mechanism of the jaws is damaged, the locking pliers are useless for their intended purpose. In addition, the typical rounded, irregular surface of most locking pliers is not easily secured in the jaws of a standard clamping vise. Finally, using a standard clamping vise to hold a pair of locking pliers may result in accidents or other dangerous conditions if the locking pliers should suddenly slip out of the jaws of the vise during use.

Recognizing both the need to securely hold or attach a pair of locking pliers, tweezers, or tongs to a stable surface and the inadequacy of existing methods for filling that need, several previous attempts at providing an apparatus for securely holding these kinds of tools have been made. For example, U.S. Pat. No. 4,089,513 issued to Mack, discloses a clamping mount for locking pliers. This patent describes a 3-point clamping mechanism which is used to hold the handle portion of the locking pliers. The 3-point clamping mechanism is attached to a simple C-clamp mounting bracket. Similarly, U.S. Pat. 3,024,018 issued to Manz, discloses a bench mount for holding locking pliers. This patent describes a clamping mechanism which securely holds the handle portion of the locking pliers and also discloses several different ways to secure the clamping mechanism to a work bench or other sturdy surface.

While useful, these two clamping mechanisms are fairly complex and operate functionally by clamping onto or holding the handle portion of the locking pliers. As described above, most typical locking pliers have an adjustable tensioning mechanism for adjusting the jaw pressure which is generally located in the handle portion of the locking pliers. A clamping device for locking pliers which clamps onto the handle portion of the locking pliers may interfere with the adjustable tensioning mechanism in the handle portion. In addition, the handle portion of the locking pliers must be manipulated to lock and unlock the clamping jaws of the locking pliers whenever an object is to be grasped or released by the jaws of the locking pliers. Any clamping mechanism which clamps onto the handle portion must necessarily limit or restrict free and easy access to the handle portion of the locking pliers. In addition, these previous inventions are special purpose tools and are not readily adaptable for holding other types of hand tools.

Therefore, there exists a need to provide a simple and reliable apparatus which can securely hold various hand tools so that the hand tools can be used as a vise, as a clamping mechanism, or to simply hold an object for manipulation. This apparatus should be able to secure the hand tool to a stable surface so that both hands can be used to manipulate the object being held or grasped. In addition, this apparatus should be readily adaptable so as to be used with the many different sizes and shapes of locking pliers and similar hand tools made available by various different companies. Preferably, this apparatus should also be adaptable for use with many different types of tools, such as medical instruments, micrometers, tweezers, pliers for home hobbies, etc.

DISCLOSURE OF INVENTION

According to the present invention, a method and clamping apparatus for securely holding objects is disclosed. The clamping apparatus works in conjunction with hand tools used for holding objects such as a pair of locking pliers, micrometers, tweezers, tongs, etc. and can be attached to a workbench, table, or other stable surface. A preferred embodiment of the clamping apparatus has two main components: a base module which can be readily attached to a workbench, table, or similar stable surface; and a clamping module which is used to securely hold the hand tool.

The two modules of the clamping apparatus fit together by inserting dowel or post pieces located on one module into corresponding holes located in the other module. The clamping module holds the hand tool in place with a variety of different methods, depending on the nature of the hand tool being clamped. For example, using a pair of pliers with the present invention, the clamping module has a screw which contacts the riveted hinge pin of the locking pliers which joins the locking pliers handles to the jaw or head portion. For a pair of tweezers, the clamping module would have a tapered slot which would securely hold the tweezers in place. The clamping module can be readily manufactured in many different shapes and sizes to accommodate the wide variety of hand tools on the market today. All of the clamping modules are easily and interchangeably connected to the base module and are held firmly in place while the hand tools are being used. In addition, an optional knurled adapter that screws into the bottom of the clamping module can be used to secure the clamping apparatus into other clamping vises or devices.

The foregoing and other features and advantages of the present invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, wherein like designations denote like elements, and.

BEST MODE FOR CARRYING OUT THE INVENTION

For ease of explanation, the present invention is described in the following description with reference to a pair of locking pliers. This is done for illustration purposes only. It should be understood that the present invention is not limited to locking pliers and that other hand tools may also be used in conjunction with the present invention.

Figure 1:
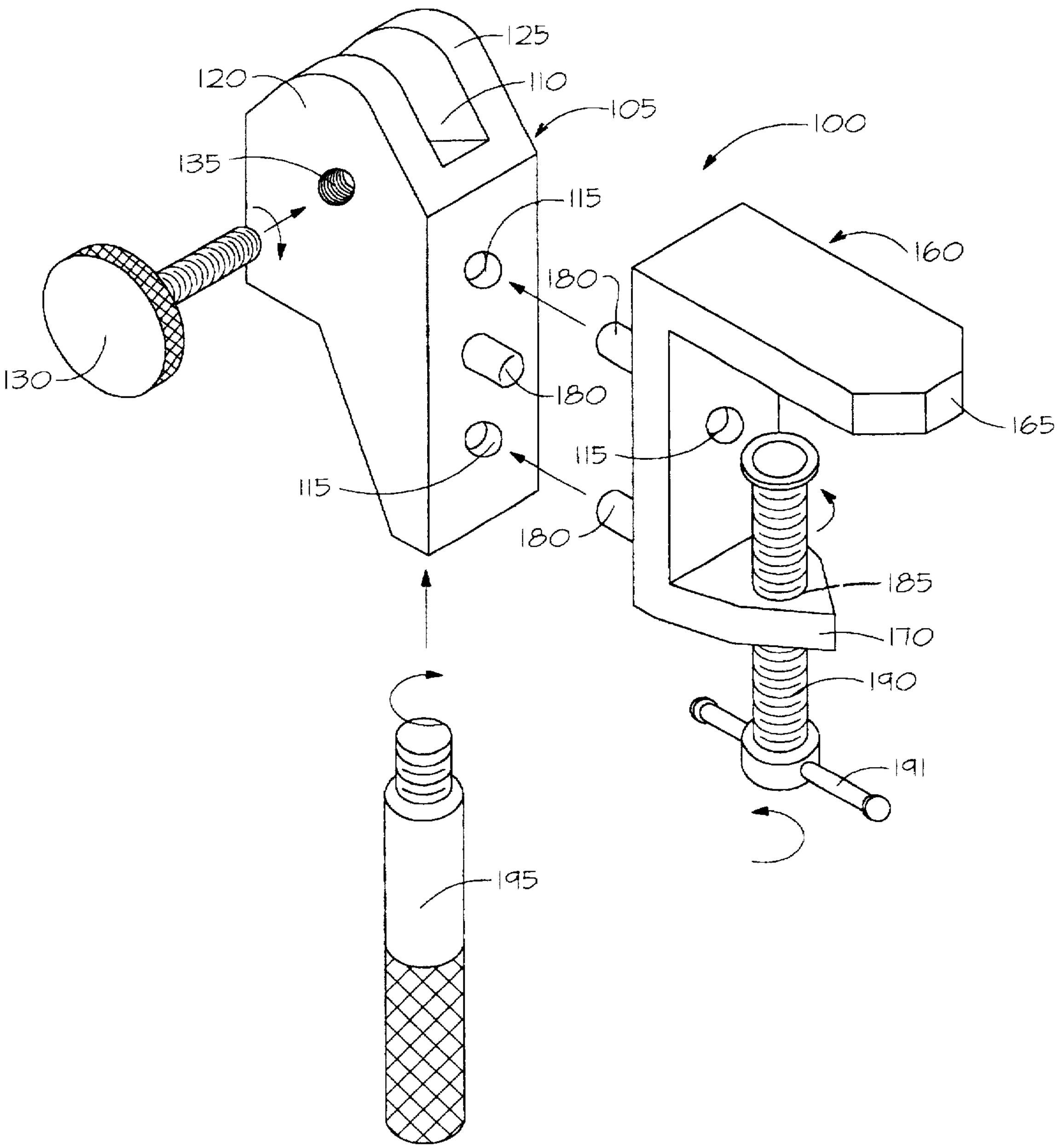
FIG. 1 is a perspective view of a clamping apparatus according to a preferred embodiment of the present invention.
Figure 2:
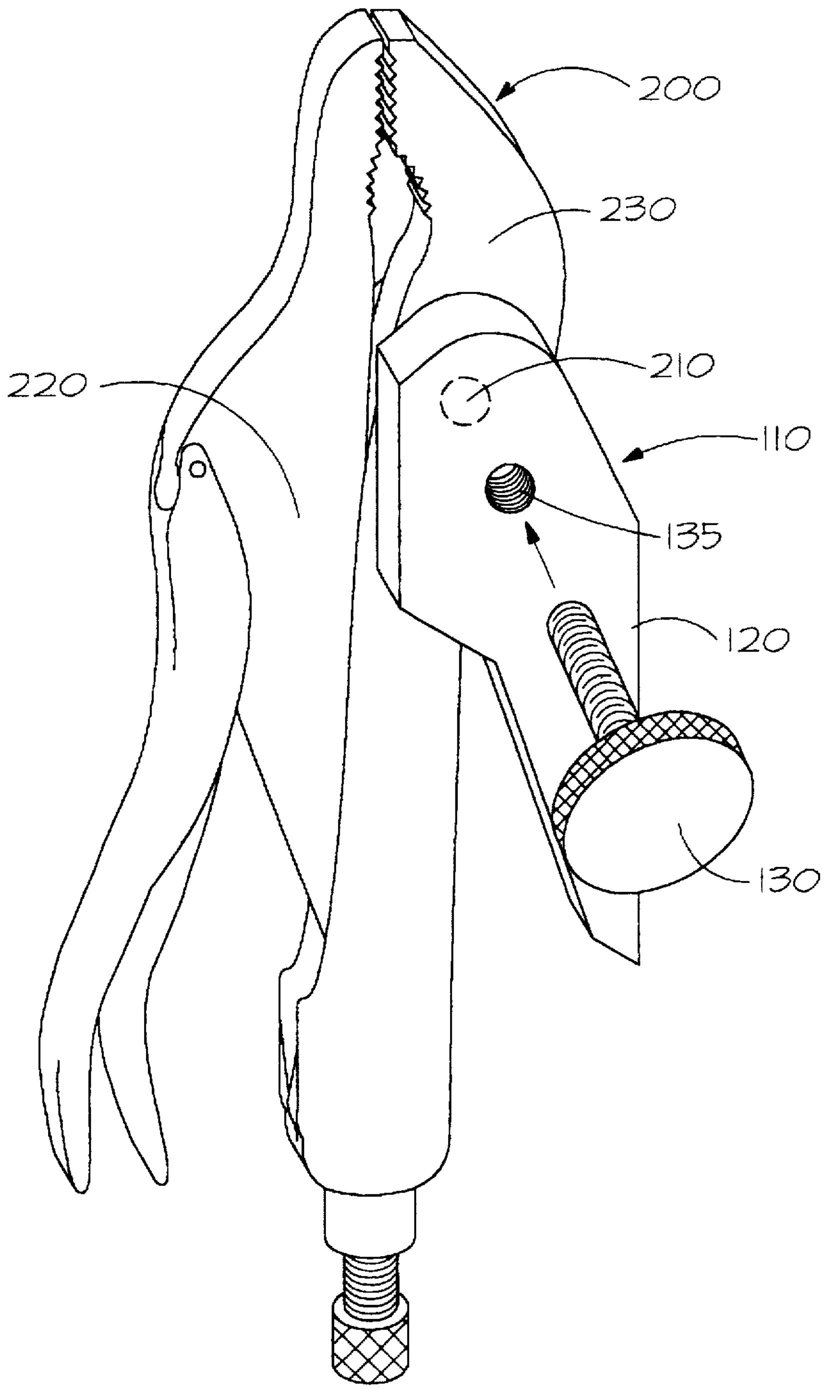
FIG. 2 is a perspective view of the clamping module of FIG. 1 used to securely hold a pair of locking pliers.

Referring now to FIGS. 1 and 2, a preferred embodiment of a clamping apparatus 100 for securely holding a hand tool and attaching clamping apparatus 100 to a workbench, table, or other stable surface includes: clamping module 105 with a body opening 110 defined by substantially parallel arms 120 and 125, mounting holes 115, a mounting dowel/post 180, a lockdown hole 135, and a lockdown knob 130; a base module 160 with parallel arms 165 and 170, mounting dowel/posts 180, a mounting hole 115, a vise screw hole 185, a vise screw 190 with a screw handle 191; an optional adapter 195 and locking pliers 200 with riveted hinge pin 210 connecting a lever-mounted handle portion 220 to a head or jaw portion 230.

Clamping module 105 receives the head portion 230 of a pair of locking pliers 200. A preferred embodiment of clamping module 105 has a generally channel-shaped body opening 110 formed by two parallel arms or facing wall members 120 and 125. Locking pliers 200 are placed into body opening 110 between arms 120 and 125 of clamping module 105. Lockdown hole 135 is internally threaded and may be located in either one or both of arms 120 or 125, making the invention easy to use for right-handed or left-handed people. When locking pliers 200 are inserted into body opening 110, riveted hinge pin 210 which attaches lever-mounted handle portion 220 of locking pliers 200 to head portion 230 of locking pliers 200, is directly aligned with lockdown hole 135. Due to the many different types of locking pliers available on the market today, the exact configuration and number of riveted pins may vary. While not always in the exact position shown, there is typically a rivet or a hinge pin which can be used with the present invention as illustrated in FIG. 2.

Lockdown knob 130 is a knob with a threaded shaft. The threads on the shaft of lockdown knob 130 match the internal threads of lockdown hole 135. Lockdown knob 130 is inserted into lockdown hole 135 so that the threaded shaft of lockdown knob 130 engages the internal threads of lockdown hole 135. In addition, lockdown knob 130 is designed to fit snugly over riveted hinge pin 210. Lockdown knob 130 is rotated until it exerts sufficient pressure on the surface of riveted hinge pin 210 so that locking pliers 200 are held firmly and securely in place between the end of lockdown knob 130 and the face of parallel arm 120 or 125, whichever is opposite lockdown hole 135.

As shown in FIG. 1, a preferred embodiment of base module 160 has a substantially U-shaped body defined by parallel arms 165 and 170. In addition, base module 160 may have multiple mounting holes 115 and/or mounting dowels/posts 180 on or in the body of base module 160. Mounting holes 115 and mounting dowels/posts 180 are sized so that mounting dowels/posts 180 slide into mounting holes 115 without excessive clearance. Mounting dowels/posts 180 may be formed as an integral part of base module 160 or clamping module 105. Alternatively, mounting dowels/posts 115 may be manufactured separately and attached to modules 105 and 160 later in the fabrication process. In a preferred embodiment of the present invention, mounting dowels/posts 180 extend into mounting holes 115 far enough to provide substantial overlap with the interior of the body of the respective modules 105 and 160 without passing completely through the body of either module 105 or 160. This prevents any side-to-side or up-and-down misalignment of clamping module 105 with base module 160. Clamping module 105 and base module 160 are pressed firmly together, thereby forming clamping apparatus 100. Vise screw 190 operates in a manner similar to the clamping screws found in a standard C-clamp which is well known to those skilled in the art. Vise screw 190 is adjusted by turning screw handle 191, thereby securely attaching clamping apparatus 100 to a workbench, table, or other stable surface.

As shown in FIG. 1, in a preferred embodiment of the present invention, clamping module 105 has two mounting holes 115 and a single mounting dowel/post 180 which is located directly between the two mounting holes 115. In this embodiment, base module 160 has two mounting dowels/posts 180 and a single mounting hole 115 which are directly opposite the appropriate mounting holes 115 and mounting dowels/posts 180 on clamping module 105. While not a limitation of the present invention, this specific configuration allows for greater stability when base module 160 and clamping module 105 are joined together as described below.

While this particular embodiment of clamping module 105 has been used to describe the operation of the invention with a pair of locking pliers, the invention is not limited to locking pliers. For example, an alternative embodiment of clamping module 105 may be designed with a tapered slot to receive a pair of tweezers. In this embodiment, the tweezers could be used to grasp an object and then the tweezers could be inserted into clamping module 105. Clamping module 105 can be attached to base module 160 as described above. In addition, the interior faces of arms 120 and 125 might be coated with a rubberized coating or other cushioning material to enhance the gripping strength of clamping module 105 and to protect the surface of the tool being held by clamping module 105.

Figure 3:
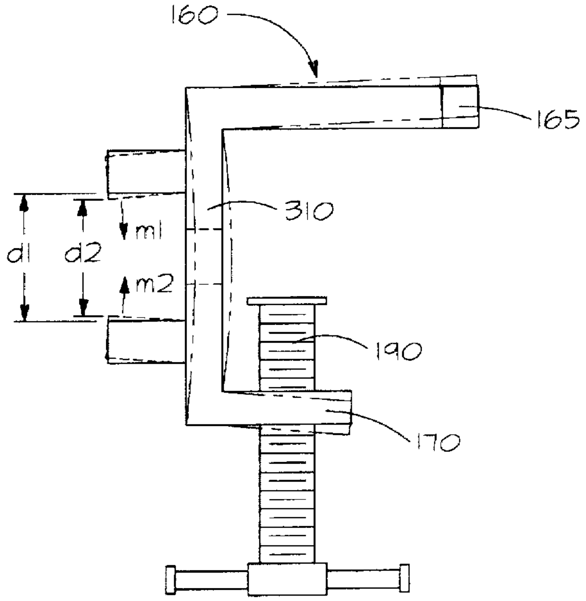
FIG. 3 is a side view of the base module of FIG. 1.

Referring now to FIG. 3, base module 160 and clamping module 105 (not shown) are held together by opposing bending moments which create a frictional binding between mounting holes 115 and mounting dowels/posts 180. Tightening vise screw 190 against the surface of a workbench, table, or other suitable stable surface forces parallel arms 165 and 170 of base module 160 slightly apart, as indicated by the phantom lines in FIG. 3. This deformation causes center portion 310 to deflect slightly, as shown. This deflection in center portion 310 creates opposing bending moments m1 and m2 in mounting dowels/posts 180, which create a force that tries to reduce the distance between mounting dowels/posts 180 from a distance d1 to a distance d2. However, if base module 160 is mounted to clamping module 105 before tightening vise screw 190, mounting dowels/posts 180 cannot move closer together, since mounting holes 115 keep mounting dowels/posts 180 the desired distance apart. However, bending moments m1 and m2 create a frictional force between mounting dowels/posts 180 and the interior of mounting holes 115 sufficient to securely hold clamping module 105 to base module 160 without any other attachment mechanism. Once vise screw 190 is loosened, the frictional binding forces are removed and clamping module 105 may be easily separated from base module 160.

As illustrated in FIG. 3, it is important to note that the dimensions of mounting holes 115 and mounting dowels/posts 180, along with the thickness of center portion 310, are important to achieve the desired function of base module 160. If center portion 310 of base module 160 is too thick, then the deflection will not be enough to create bending moments m1 and m2 sufficient to hold the two modules together. On the other hand, if center portion 310 is too thin, center portion 310 may not withstand the force of bending moments m1 and m2 and may collapse, buckle, or become incapable of holding clamping apparatus 100 to the table or work surface.

The preferred embodiment of base module 160 is manufactured from standard ¼ inch (6.35 mm) aluminum channel or, alternatively, is fabricated using a molding process. In addition, mounting holes 115 and mounting dowels/posts 180 must be closely matched in size. The diameter of mounting dowels/posts 180 must be small enough to slip inside mounting holes 115 without excessive clearance. If the diameter of mounting dowels/posts 180 is too small when compared to the inside diameter of mounting holes 115, then the bending moments m1 and m2 will not generate enough frictional force on the interior of mounting holes 115 to hold the modules together. In the preferred embodiment of the present invention, the tolerances are ±0.001 inch (±0.00254 mm). However, it is anticipated that production manufacturing tolerances as much as 0.01 inch (±0.0254 mm) would still generate acceptable performance for the frictional connection between base module 160 and clamping module 105. In addition, centerline alignment of mounting holes 115 with mounting dowels/posts 180 is very important to ensure that manufacturing tolerances can be kept within the appropriate limits.

While a preferred embodiment of the present invention uses frictional contact to hold base module 160 and clamping module 105 together, other alternative methods are available for joining the two and are within the scope of the present invention. For example, a cotter pin inserted through base module 160 and clamping module 105 could be used to hold the modules together. Also, a screw could be inserted through a hole in arm 125 of clamping module 105 so as to contact either of mounting dowels/posts 180, thereby holding the two modules together. Alternatively, a removable spring-loaded collar, a twist-lock mechanism, or a tapered notch system could be used to hold base module 160 and clamping module 105 together. However accomplished, in a preferred embodiment, clamping module 105 and base module 160 are joined together to form a single unit.

Alternatively, if desired, clamping apparatus 100 could be manufactured as a single integrated unit without a detachable clamping module. The integrated clamping apparatus 100 would have a one-piece body with a clamping portion and a base portion with a mechanism for attaching the clamping apparatus 100 to a workbench, table, or other suitable surface. In operation, this uni-body clamping apparatus 100 would be functionally similar to the 2-piece clamping apparatus 100 described above in that it would securely hold the locking pliers in the clamping portion using lockdown knob 130 to contact the head portion 230 of locking pliers 200. This embodiment is not currently preferred because clamping apparatus 100 would be limited and would not be able to have a wide variety of different clamping modules 105 to accommodate the many different sizes and shapes of locking pliers and other tools available for use today.

After locking pliers 200 have been secured in clamping module 105 and clamping apparatus 100 is attached to a workbench, table, or other suitable surface, the jaws of locking pliers 200 can be used as a vise-like mechanism to clamp and hold an object. This allows an individual to use both hands to work on the object being held in the jaws of locking pliers 200. The tensioning adjustment mechanism located in the handle portion of locking pliers 200 may be easily accessed to adjust the jaw pressure of locking pliers 200 and the handle portions of locking pliers 200 can be easily manipulated to lock or release the jaws of locking pliers 200.

Although a preferred embodiment of base module 160 is shown with vise screw 190 as the mechanism for attaching base module 160 to a workbench, table, or other suitable surface, base module 160 could be attached by any other suitable means. For example, a spring-loaded, lever-actuated mounting apparatus or a cam-actuated mechanism might be substituted for vise screw 190.

Figure 4:
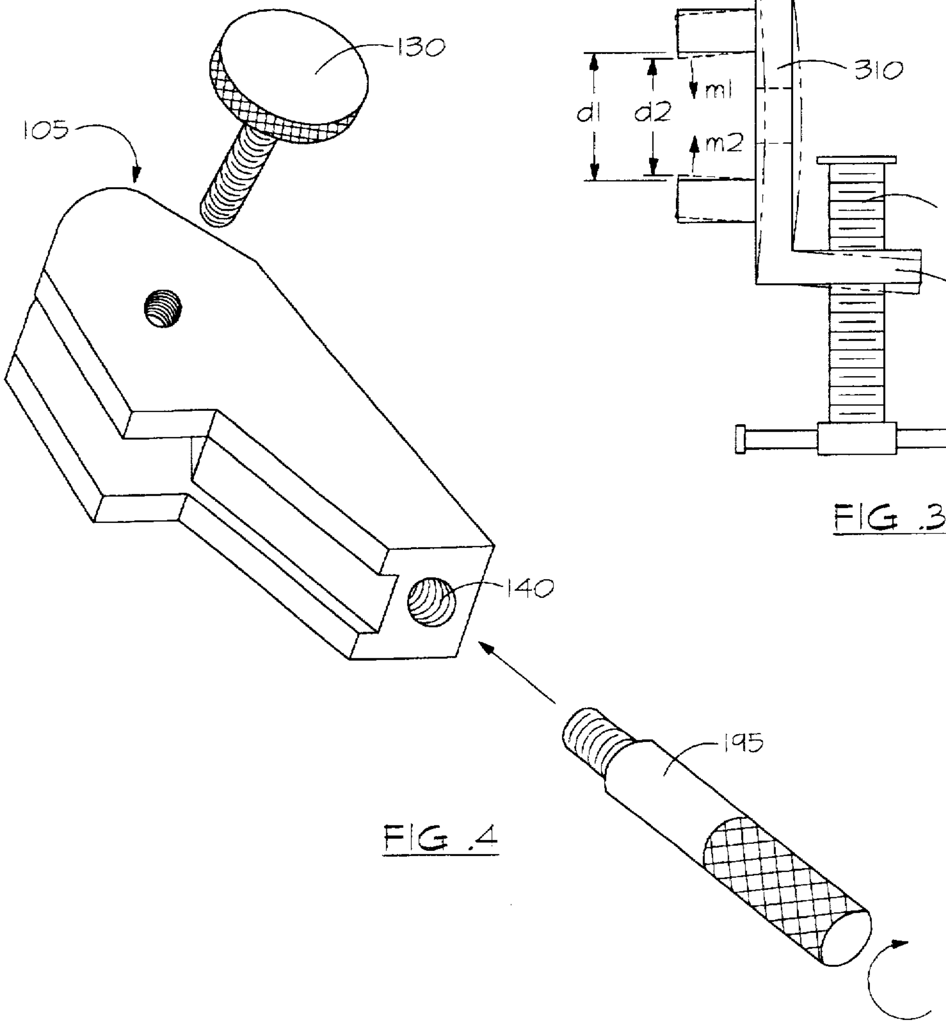
FIG. 4 is a perspective view of the clamping module and adapter of FIG. 1.

Referring now to FIG. 4, adapter 195 is an extension handle with a threaded shaft which screws into an adapter hole 140 located in the bottom of clamping module 105. Adapter hole 140 is internally threaded to match the threads on the threaded portion of the shaft of adapter 195. When adapter 195 is inserted and tightened into position into adapter hole 140, adapter 195 allows clamping module 105 to be used with other clamping devices such as the PanaVise, a multi-function clamping apparatus with a suction-mounting base unit. The PanaVise has an adjustable swivel head containing a contractible orifice. The orifice adjustably contracts to grasp rod-like handles that are inserted into the orifice. In a preferred embodiment of the present invention, adapter 195 is provided and is sized to fit into the PanaVise orifice.

Alternatively, adapter 195 could be secured in the jaws of a standard clamping vise mechanism. While a specific preferred embodiment of adapter 195 has been shown and described for purposes of illustration, additional adapters can be easily designed in other shapes and sizes to allow the present invention to be used with virtually any other type of vise clamping mechanism. The specific size and shape of the preferred embodiment of adapter 195 shown in FIG. 1 is for illustration purposes only and is not a limitation of the present invention.

Referring now to FIG. 2, a pair of locking pliers 200 is shown inserted into clamping module 105. Locking pliers 200 can be any type of locking pliers manufactured now or developed in the future. Because clamping module 105 is detachable from base module 160 (not shown), multiple clamping modules 105 can be manufactured to accommodate any sizes or shape or locking pliers. In addition, other clamping modules 105 may be designed to hold hand tools such as tweezers, tongs, forceps, etc. These other clamping modules 105 may be designed to work with base module 160 and can be quickly and easily attached to base module 160 as described above. Although a preferred embodiment of clamping module 105 has been described with lockdown hole 135 and lockdown knob 130, any other mechanism or method for securely holding or fastening hand tools to clamping module 105 is within the scope of the present invention.

Referring now to FIGS. 1 and 2, a preferred embodiment of the method of the present invention is accomplished by inserting locking pliers 200 into clamping module 105 and aligning the riveted hinge pin 210 that connects the handle portions 220 of locking pliers 200 to the head portion 230 of locking pliers 200 with internally threaded lockdown hole 135. Threaded lockdown knob 130 is inserted into lockdown hole 135 and rotated until it exerts sufficient pressure on riveted hinge pin 210 so that locking pliers 200 are firmly and securely held in place. Then, mounting holes 115 located in one module are aligned with mounting dowels/posts 180 located on the other module. Clamping module 105 and base module 160 are pressed together, forming clamping apparatus 100. Vise handle 190 is then adjusted to secure clamping apparatus 100 to a workbench, table, or other stable surface. At this point, the jaws of locking pliers 200 can operate as a vise mechanism to hold an object so that an individual can use both hands to work on the object. The tensioning adjustment mechanism located in the handle portion of locking pliers 200 may be easily accessed and the handle portions of locking pliers 200 can be manipulated to lock or release the jaws of locking pliers 200.

Alternatively, clamping apparatus 100 may be attached to a workbench, table, or other stable surface first, and then locking pliers 200 may be secured in clamping module 105. Optionally, instead of using vise handle 190 to secure clamping apparatus 100 to a workbench, table, or other suitable surface, adapter 195 may be used to secure clamping apparatus 100 as described above. The preferred embodiment of clamping apparatus 100 is constructed from aluminum, an aluminum alloy, or other metal which is suitable for a high volume, mass production environment. This would include any suitable metal known to those skilled in the art. One example would be to construct the components of clamping module 100 entirely from stainless steel for the medical tools market. Since medical tools must be frequently sterilized in autoclaves, the durability and temperature resistant nature of stainless steel would be preferred over aluminum. While other metals may be used, aluminum is preferred for most applications because of its light weight, low manufacturing costs, and easy adaptability to manufacturing and production processes. In addition, other, non-metal materials may be used in a preferred embodiment of clamping apparatus 100. This might include materials such as high-strength plastics or synthetic compounds. Any material may be used so long as the materials used are strong, durable, and formable or machinable with lightweight, inexpensive materials being preferred. In addition, in a preferred embodiment as illustrated in FIG. 3, the material must be flexible enough to create bending moments m1 and m2 sufficient to hold the two modules together. Clamping apparatus 100 may be manufactured by any suitable fabrication process known to those skilled in the art. This would include machining, molding, or any other materials forming processes.

Figure 5:
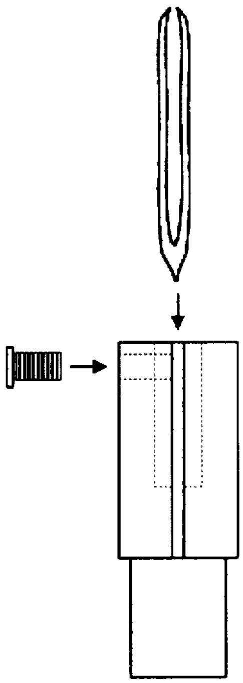
FIG. 5 is an end view of an alternative embodiment of a clamping module adapted for use to hold a pair of tongs.

While the invention has been particularly shown and described with reference to preferred embodiments thereof, it will be understood by those skilled in the art that various changes in form and details may be made therein without departing from the spirit and scope of the invention. While the preferred embodiment described herein is directed towards locking pliers, the present invention is not limited to locking pliers but may be used with other hand tools as well. For example, while the present invention has been described with a clamping module 105 for holding locking pliers 200, it is anticipated that future clamping modules 105 will be developed to accommodate other tools. This might include surgical tools, tongs, fishing pliers, home and hobby related tools, etc. (for example, see FIG. 5)

I claim:

1. A clamping apparatus for use with a pair of locking pliers, the apparatus comprising:

a two-piece body, the body comprising:

a base portion, the base portion having opposing faces that are substantially parallel forming a channel and a center portion joining the opposing faces with a plurality of dowels coupled to the base portion;

a clamping module, the clamping module comprising:

a clamping body having opposing faces that are substantially parallel forming a channel for receiving the locking pliers, a center portion joining the opposing faces, and a plurality of holes in the clamping body; and a mechanism for securely holding the pair of locking pliers within the clamping body channel;

wherein the clamping module is removably coupled to the base portion by opposing bending moments in the plurality of dowels that create frictional force with the plurality of holes; and a handle coupled to the clamping module to allow the clamping module to be coupled to a clamping device.

2. A clamping apparatus for use with a pair of locking pliers, the apparatus comprising:

a base portion comprising:

a base body having opposing faces that are substantially parallel;

a center portion joining the opposing faces, thereby forming a base body channel;

at least two dowels coupled to the center portion of the base portion; and a vise screw threaded through one of the opposing faces;

a clamping portion comprising:

a clamping body having opposing faces that are substantially parallel forming a clamping body channel for receiving the locking pliers and a center portion joining the opposing faces;

at least two holes in the center portion of the clamping body aligned to receive the at least two dowels on the base portion;

at least one threaded hole disposed in at least one of the opposing faces that form the clamping body channel;

at least one lock screw threaded into the threaded hole for engaging a jaw portion of the pair of locking pliers in the channel;

a handle removably coupled to the body; and wherein the base portion and the clamping portion are frictionally coupled by movement of the at least two dowels in the at least two holes aligned to receive the at least two dowels.

* * * * *